No. 735,320. PATENTED AUG. 4, 1903.
D. F. VAUGHAN.
MEANS FOR SECURING SPLICE BARS TO RAILS.
APPLICATION FILED OCT. 7, 1902.
NO MODEL.
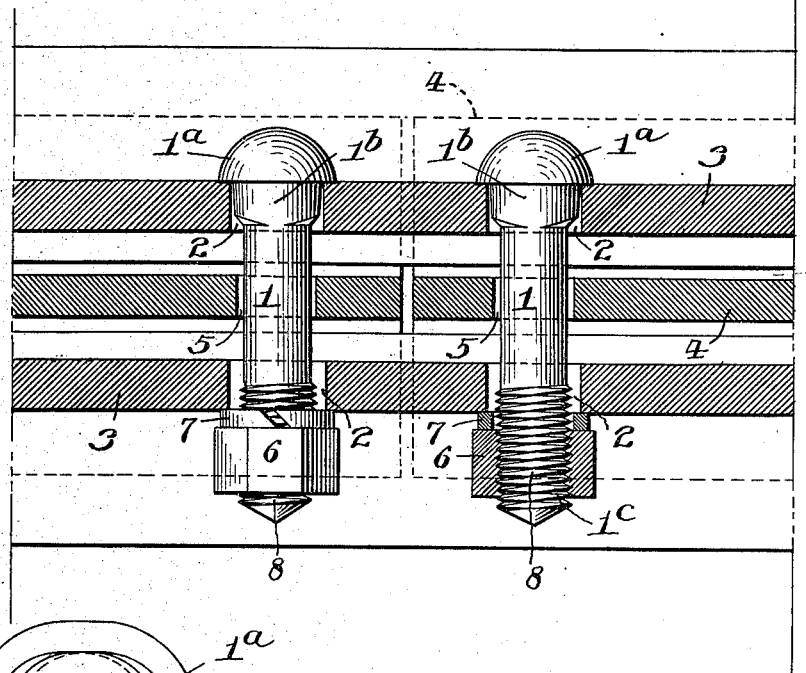
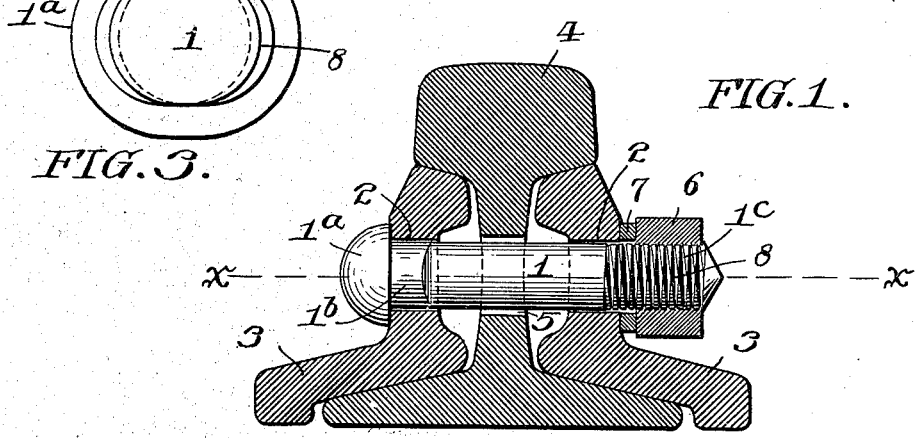
WITNESSES:
R. N. Perkins.
Walter C. Pusey.
INVENTOR:
David F. Vaughan,
BY
Joshua Pusey,
ATTORNEY.

No. 735,320.

Patented August 4, 1903.

UNITED STATES PATENT OFFICE.

DAVID F. VAUGHAN, OF HADDONFIELD, NEW JERSEY.

MEANS FOR SECURING SPLICE-BARS TO RAILS.

SPECIFICATION forming part of Letters Patent No. 735,320, dated August 4, 1903.

Application filed October 7, 1902. Serial No. 126,300. (No model.)

*To all whom it may concern:*

Be it known that I, DAVID F. VAUGHAN, a citizen of the United States, residing at Haddonfield, in the county of Camden and State of New Jersey, have invented certain new and useful Improvements in Means for Securing Splice-Bars to Rails, of which the following is a full, clear, and exact description, reference being had to the accompanying drawings, of which—

Figure 1 is a section through a railway-rail and splice-bars, showing the bolt in place securing the splice-bars to the rail. Fig. 2 is a section through two meeting rails and the splice-bars for securing the same together, showing two of the bolts in place, being a horizontal section as on line $xx$, Fig. 1. Fig. 3 is an enlarged end view of the bolt.

The object of this invention is to provide a bolt adapted to be used for securing the usual splice-bars to rails, in which the screw-threaded portion of the bolt shall be of increased strength without material addition to the cost of making the bolt and which may be used in connection with the ordinary splice-bars now in use.

The invention consists in upsetting the bolt-blank adjacent to the end thereof in the form of an oval in cross-section and providing such upset portion with screw-threads adapted to receive the usual nut.

Referring to the accompanying drawings, 1 designates the body of the bolt, which is round in cross-section; $1^a$, the head; $1^b$, the part adjacent to the latter, which is oval in cross-section, and $1^c$ is the screw-threaded end of the bolt. When in use, the bolt is passed through oval holes 2 in the splice-bars 3 on opposite sides of the rail 4 and through a hole 5 in the web of the rail, and a nut 6 is screwed onto the bolt against an interposed washer 7.

The foregoing describes generally the construction now in common use on railways.

In carrying out my invention it is not necessary to make any change in the form or construction of the usual bolt, except that I upset the end portion in the form of an oval in cross-section, the longest or horizontal diameter of which oval is greater than that of the body of the bolt and the shortest or vertical diameter of the oval is slightly greater than or substantially the same as that of the body of the bolt, as shown in the drawings, and I provide said oval portion with the usual screw-threads 8, adapted to receive the nut 7.

By the construction just described I retain all the advantages of the usual bolt, but with increased strength in the screw-threaded portion thereof, with but little greater cost than the ordinary bolt.

I may also add that by making the end of the bolt oval in cross-section the oval part $1^b$, adjacent to the head, may be dispensed with and that part be made of the same form and thickness as the body of the bolt, the oval end portion of the bolt extending through a suitable oval hole in the splice-bars sufficing to prevent the turning of the bolt when the nut is screwed up or unscrewed.

Having thus described my invention, I claim as new and desire to secure by Letters Patent—

1. A bolt for securing splice-bars to rails having the enlarged screw-threaded end portion oval in cross-section, substantially as and for the purpose recited.

2. The combination of the rails, having the holes, the splice-bars having the oval holes, and the bolts having respectively the screw-threaded end portions oval in cross-section, and the nuts on said bolts for clamping said parts together, substantially as and for the purpose recited.

In testimony whereof I have hereunto affixed my signature this 23d day of July, A. D. 1902.

DAVID F. VAUGHAN.

Witnesses:
 EDWIN M. ABBOTT,
 WALTER C. PUSEY.